(12) United States Patent
Modi (10) Patent No.: US 7,783,718 B2
(45) Date of Patent: Aug. 24, 2010

(54) LOCATING SERVICES USING COMPILED SCOPES

(75) Inventor: Vipul A. Modi, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1105 days.

(21) Appl. No.: 11/424,458

(22) Filed: Jun. 15, 2006

(65) Prior Publication Data

US 2007/0294711 A1    Dec. 20, 2007

(51) Int. Cl.
G06F 15/16 (2006.01)
G06F 3/00 (2006.01)
(52) U.S. Cl. ........................... 709/217; 719/330
(58) Field of Classification Search .............. 709/217; 719/330
See application file for complete search history.

(56) References Cited

U.S. PATENT DOCUMENTS

| 6,957,199 | B1* | 10/2005 | Fisher | 705/78 |
|---|---|---|---|---|
| 7,412,518 | B1* | 8/2008 | Duigou et al. | 709/227 |
| 2003/0028451 | A1* | 2/2003 | Ananian | 705/27 |
| 2004/0043758 | A1* | 3/2004 | Sorvari et al. | 455/414.1 |
| 2004/0088347 | A1* | 5/2004 | Yeager et al. | 709/202 |
| 2004/0139151 | A1* | 7/2004 | Flurry et al. | 709/203 |
| 2006/0112398 | A1* | 5/2006 | Mukkamala et al. | 719/316 |

FOREIGN PATENT DOCUMENTS

| EP | 1650988 | 4/2006 |
|---|---|---|
| KR | 20060033889 | 4/2006 |
| WO | WO 2004/086679 | 10/2004 |

* cited by examiner

*Primary Examiner*—William C Vaughn, Jr.
*Assistant Examiner*—Muktesh G Gupta
(74) *Attorney, Agent, or Firm*—Workman Nydegger (57) ABSTRACT

In a computing environment incorporating multiple computing systems capable of intercommunication, a computing system assists in locating a service offered by other computing system(s). For instance, upon receiving a query that represents a scope of a service to be located, the scope represented in the query may be compared with compiled scope information, each scope compiled using different matching rules. The provider of the service may then be located based on the comparison. The service provider may then be identified.

13 Claims, 6 Drawing Sheets

LOCATING SERVICES USING COMPILED SCOPES

BACKGROUND

Communications devices are increasingly used in today's society. The rapid adoption of these devices has created a demand for trouble-free interoperability. Numerous companies produce communications devices and many of such devices have their own set of rules by which they communicate. Consumers of these devices demand interoperability, both between the devices and between the applications that run on them, so as to efficiently access the services offered by connected devices.

For example, one category of services may be consistent with the Web Services protocols jointly engineered by MICROSOFT Corporation, IBM, and others, although devices may additional or alternatively offer services that are not compliant with the Web Services protocols. Web Services is a standardized way of integrating applications. Standardized XML documents can be used with SOAP (Simple Object Access Protocol) messages and WSDL (Web Services Description Language) descriptions to integrate applications without an extensive knowledge of the applications being integrated. Web Services can also be used to enable communication between devices. The Web Services may be implemented on various types of devices and may be located using the "WS-Discovery" protocol.

Typically, if implementing Web Services protocols, a client will send a multicast message using the WS-Discovery protocol to locate a desired Web Service. The multicast message contains a "scope" which is used to identify the desired Web Service. For example, if a user located on the $10^{th}$ floor of a building wanted to print a document using a color printer located on the $10^{th}$ floor, the scope would include the floor number and desired printer functionality which is color printing in this case. As another example, if the user wanted to communicate with web-enabled cellular phones with the phone numbers ranging from 555-8000 to 555-8010, the scope would include only those cellular phones that were web-enabled and that were within that range of phone numbers.

Each device that receives the multicast message may then perform appropriate processing using the provided scope to determine whether the device contains the desired Web Service. After performing the processing, the devices will respond to the multicast message to allow the requesting client to identify those devices that are capable of providing the requested service as identified by the scope.

These multicast messages and the numerous responses generated thereby lead to significant network traffic and congestion. Furthermore, the devices offering the services often have little computational power and are often ill-suited to processing multiple multicast requests.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In one embodiment of this invention, a user can locate a service without necessarily placing a substantial burden on the network or the systems offering the services. The user may input, for example, one or more search criteria, whereupon the user's computer system may compile a scope using one or more matching rules. This compiled scope can be used to identify a service. The user transmits a query containing the compiled scope which is received by a computer system offering a service. In one instance, the compiled scope allows the computer system to perform a simple string match, instead of having to process a complex algorithm to determine whether the system is providing the desired service.

In another embodiment, the user can avoid flooding the network with a multicast message by sending a query to a proxy which compares the query to a set of pre-compiled scopes. After comparing the query, the proxy returns the message to the user's computer with a list of systems offering the desired service. In this manner, both network bandwidth and computer system processing power may be benefited by the decreased burden on resources.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
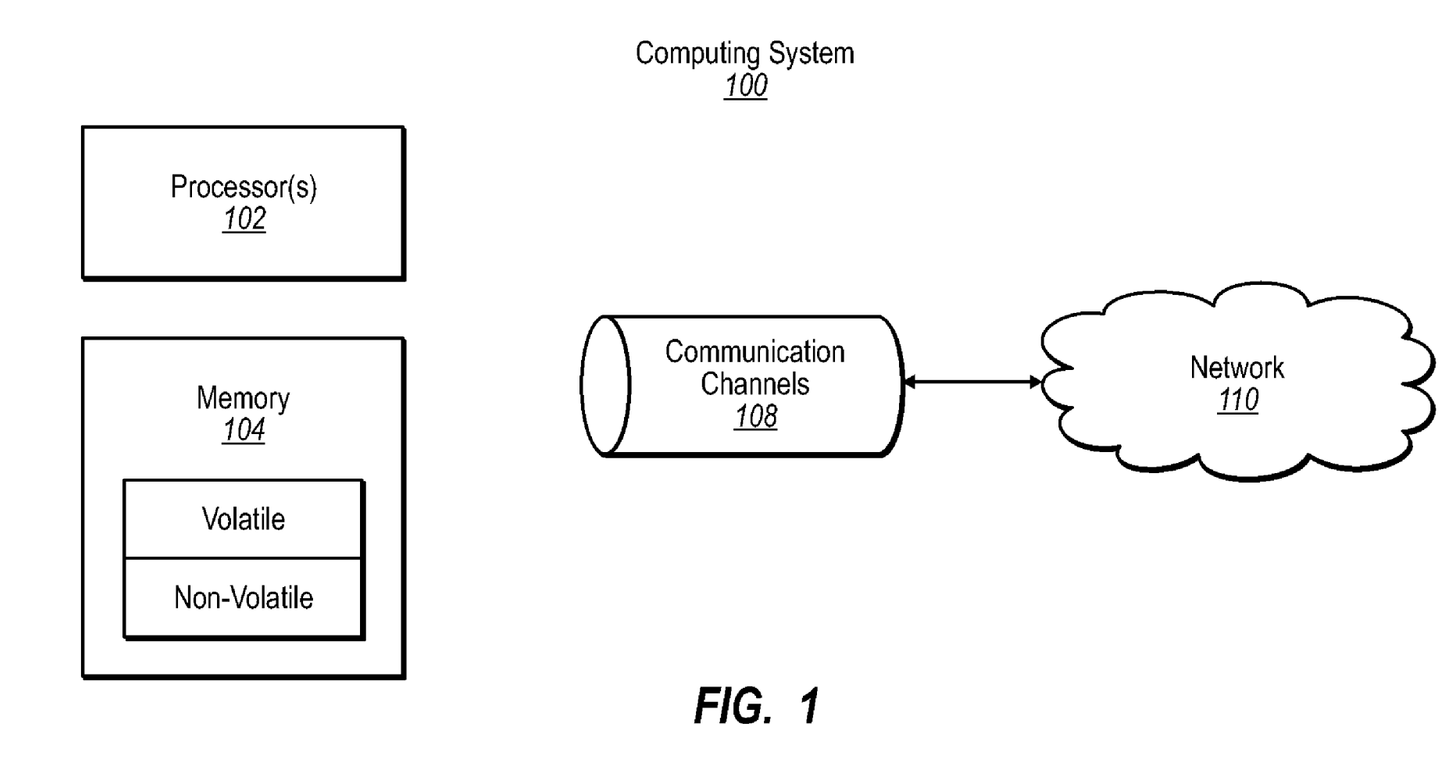
FIG. 1 illustrates a computing system in which embodiments of the principles of the present invention may operate.

Embodiments of the present invention extend to compiling scopes for identifying and locating services in a computing system. Embodiments herein may comprise a special purpose or general-purpose computer including various computer hardware, as discussed in greater detail below. FIG. 1 shows a schematic diagram of an example computing system 100 that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, distributed computing systems, or even devices or systems that have not conventionally been considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be system memory, which may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage such as physical storage media. Such storage may be removable or non-removable, and may include (but is not limited to) PCMCIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored or included in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
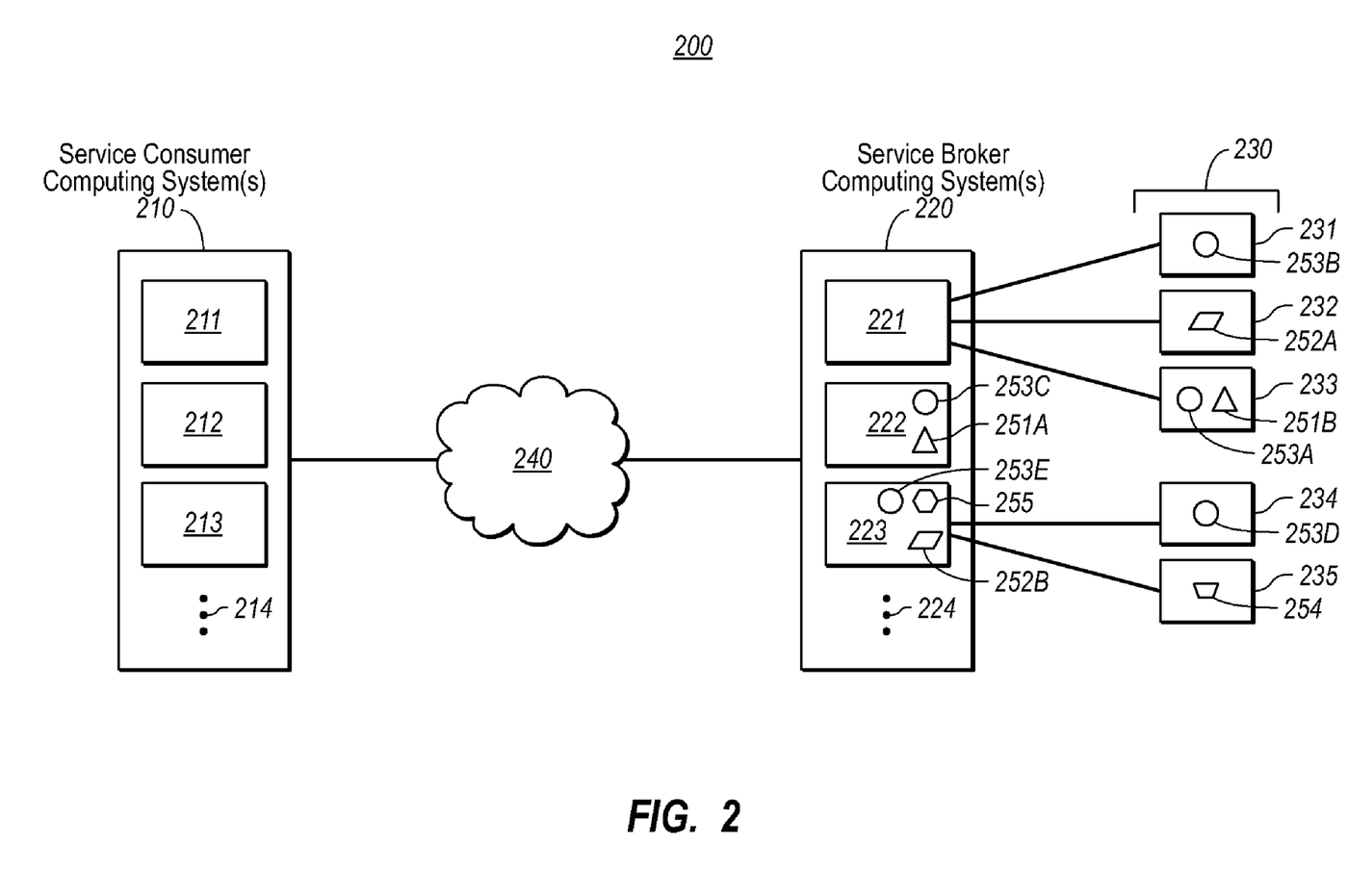
FIG. 2 schematically illustrates an environment in which embodiments of the present invention may operate including a number of service consumer computing systems generating queries used to locate services, and a number of service broker computing systems providing responses to queries.

FIG. 2 illustrates an environment 200 in which the principles of the present invention may be employed. The environment 200 includes one or more service consumer computing systems 210 as well as one or more service broker computing systems 220. Services 251-255 are represented by various shapes, including triangles 251, parallelograms 252, circles 253, trapezoids 254, or hexagons 255. Each shape type may correspond to a different type of service. For example, Web Services may be indicated by trapezoids 254. In case where there are multiple instances of the same type of service, separate instances of the service are labeled with the appropriate number identified above followed by a letter, for example, 253A, 253B, 253C, etc.

A service can be computer code or a software application or other means of providing access to some desired functionality. For example, a printer may provide a printing service; a VPN server (Virtual Private Network server) may provide a VPN service. A Web Service is a type of service which allows computing systems to intercommunicate using, for example, SOAP (Simple Object Access Protocol) messages. Web Services also facilitates the integration of applications by providing XML (Extensible Markup Language) and WSDL (Web Services Description Language) description capability. Any of the services 251-255 may be a Web Service or other type of service.

Any of the service consumer computing systems 210 may be a computing system that uses a service or is seeking a service to use. Any of the service broker computing systems 220 may be a computing system which either provides a service directly or provides a link to another service provider 230. Computing systems 210 and 220 are capable of intercommunication via a computing network 240. The computing network 240 may be a wired or a wireless network.

In the computing environment 200, multiple service consumer computing systems 211-214 may exist. For example, in FIG. 2, the service consumer computing systems 210 are illustrated as including three service consumer computing systems 211, 212 and 213. However, the vertical ellipses 214 represents that the service consumer computing system 210 may include even more than the illustrated three service consumer computing systems, and is also used here to represent that there may be only one or perhaps two service consumer computing systems without affecting the principles of the present invention.

Similarly, multiple service broker computing systems 221-224 may also exist in environment 200. For example, in FIG. 2, the service broker computing systems 220 are illustrated as including three service consumer computing systems 221, 222 and 223. However, the vertical ellipses 224 represents that the service broker computing system 210 may include even more than the illustrated three service broker computing systems, and is also used here to represent that there may be only one or perhaps two service broker computing systems without affecting the principles of the present invention.

Each service consumer computing system 211-214 may be capable of communicating with any service broker computing system 221-224, and in turn, with any service provider 230 that is linked by any one of the service broker computing systems 221-224. In computing environment 200, service broker computing system 221 provides no services directly, but is linked to three service providers, 231, 232, and 233, which provide services 253B, 252A, and 253A and 251B, respectively. Service broker computing system 222 provides services 253C and 251A directly, but is not linked to any other service providers 230. Service broker computing system 223 provides three services directly, 253E, 255, and 252B, and is linked to other service providers 234 and 235 which provide services 253D and 254, respectively. Service broker computing systems may directly provide any number of services or links to service providers 230.

Figure 3:
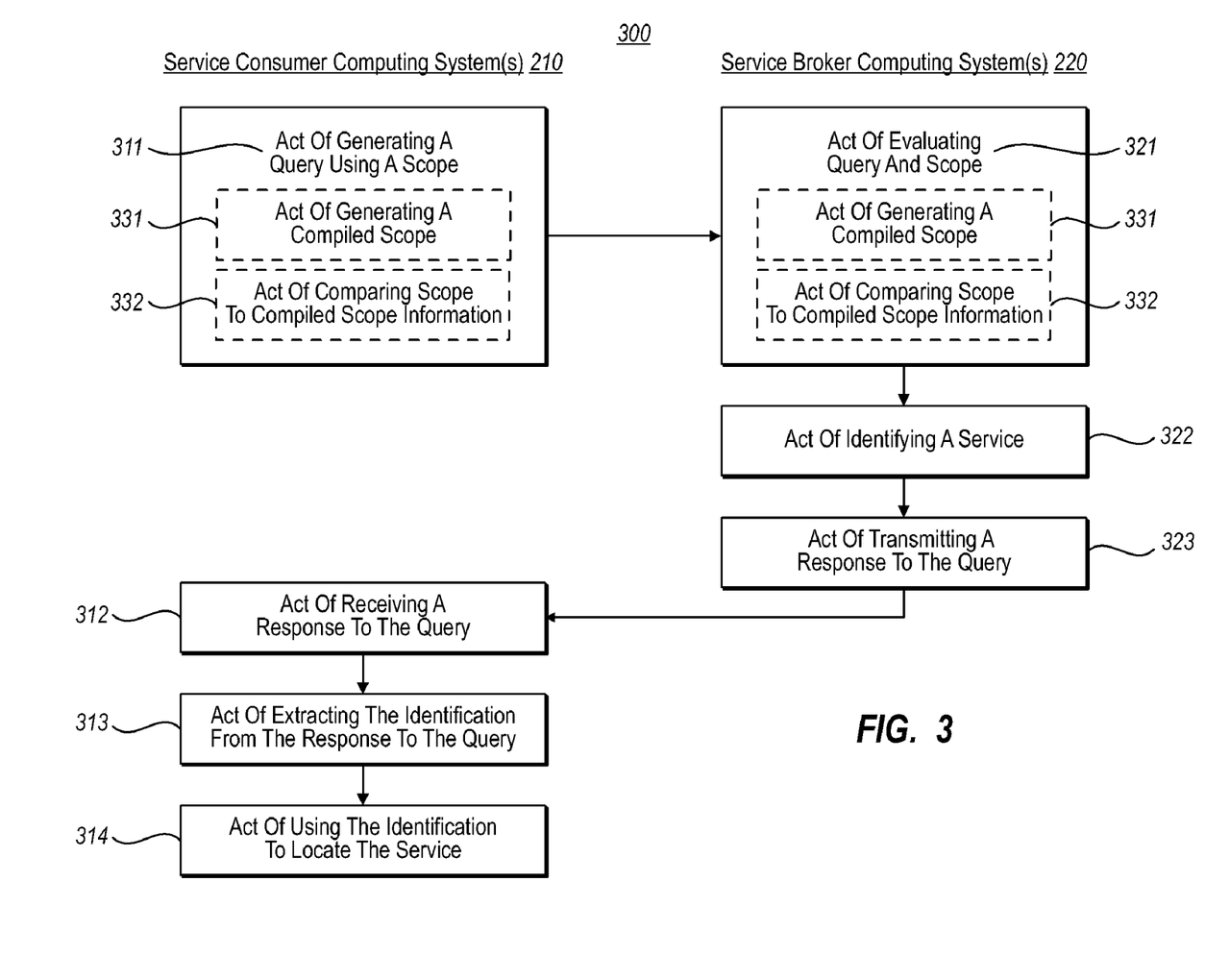
FIG. 3 illustrates a flowchart of a method for locating services in accordance with embodiments of the present invention.

FIG. 3 illustrates a flowchart of a method 300 for a service consumer computing system 210 to assist in locating a service offered by one or more service broker computing systems 220 or service providers 230. As the method 300 may be performed in the context of the environment 200 of FIG. 2, the method 300 of FIG. 3 will now be described with frequent reference to FIG. 2. Acts that are or may be performed by the service consumer computing system are illustrated in the left column of FIG. 3 under the heading "Service Consumer Computing System(s)-210". Acts that are or may be performed by the service broker computing system are illustrated in the right column of FIG. 3 under the heading "Service Broker Computing System(s)-220".

The method 300 includes an act of generating a query that represents a scope of a service to be located (act 311). A scope is a contextual identification of an item, for example, an identification of the location of a service. For instance, if a user requested a service such as color printing on the 4$^{th}$ floor of their building, the scope would include the requested service of color printing, and the requested location, namely, the 4$^{th}$ floor. Continuing this example, a query would be generated (act 311) that represents the scope (color printing service, 4$^{th}$ floor). The query may contain a textual representation of the scope and/or it may contain user-inputted search criteria or perhaps a simple notification message. User-inputted search criteria may include, for example, general information about the services desired.

For example, if a user wanted to search for all scanners or facsimile machines on the 4$^{th}$ floor, the search criteria would include scanners and facsimile machines located on the 4$^{th}$ floor. The search criteria may be used to generate a scope. In some embodiments, a scope is a URI (Uniform Resource Identifier). Regardless of how the scope is generated, the scope may be compiled with matching rules to create a compiled scope (act 331). Act 331 may include multiple steps which are illustrated in the data structure and flow 400 of FIG. 4 (hereinafter referred to as "data flow 400").

Figure 4:
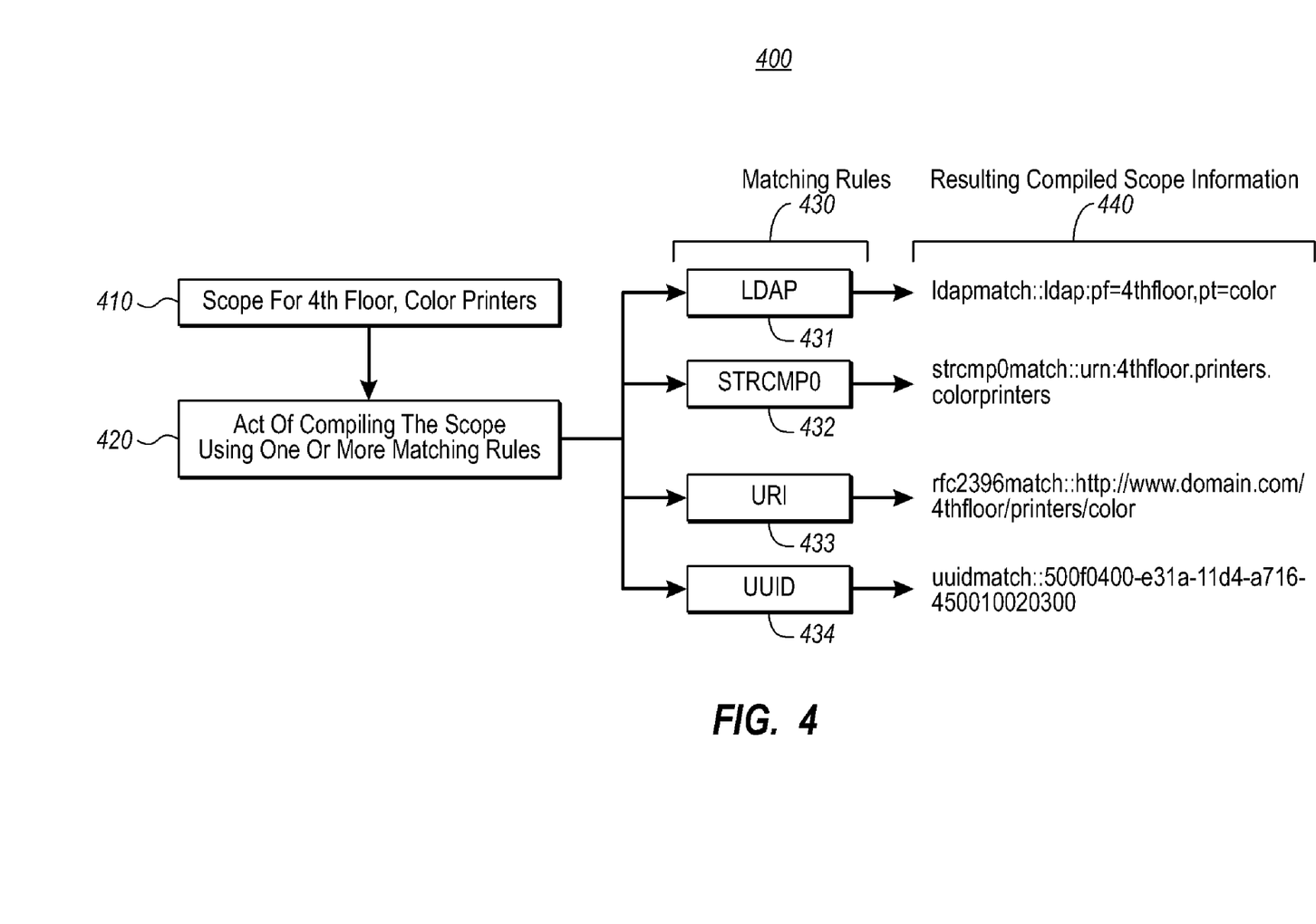
FIG. 4 illustrates a flow diagram showing an example scope that is compiled according to a variety of matching rules in accordance with embodiments of the present invention.

Data flow 400 in FIG. 4 illustrates the act of generating a compiled scope as identified by act 331 (see FIG. 3). A scope 410 may be compiled (see act 420) with matching rules 430 to generate resulting compiled scope information 440. In this description and in the claims, matching rules 430 are defined as a mechanism for categorizing and/or locating services in the environment 200.

In one embodiment, for example, an LDAP (Lightweight Directory Access Protocol) scope for a color printer on the 4$^{th}$ floor (e.g. "ldap:///pf=4thfloor,pt color") could be compiled with an LDAP 431 matching rule. In that case, the following compiled scope information may result: "ldapmatch::ldap:///pf=4thfloor,pt=color", where "pf" is known in the appropriate LDAP schema to mean "printer floor" and "pt" is known to mean "printer type."

Referring again to FIG. 4, another matching rule may include a STRCMP0 (String Compare) 432 matching rule, which generates a text string using the scope. For instance, the same color printer on 4$^{th}$ floor scope (e.g. "urn:4thfloor.printers.colorprinters" might result in the following when compiled using String Compare: "strcmp0match::urn:4thfloor printers colorprinters".

A URI (Uniform Resource Identifier) 433 matching rule may also be used. The URI matching rule formulates the scope in the form of a URI such as a URL (Uniform Resource Locator). The resulting compiled scope information for the 4$^{th}$ floor color printer example when compiled using the URI 433 matching rule might appear as follows: "rfc2936match:: http://www domain.com/4thfloor/printers/color".

A UUID (Universally Unique Identifier) 434 matching rule may also be used, which represents the scope as a simple unique identifier. For instance, the 4$^{th}$ floor color printer scope may simply be represented by the following identifier: "500f0400-e31a-11d4-a716-450010020300", where some portions of the identifier may (or may no11t) be correlated to particular aspects of the scope. The compiled scope may appear as follows: "uuidmatch::500f0400-e31a-11d4-a716-450010020300."

In some embodiments, a scope is compiled with less than all types and potentially one type (e.g., due to compatibility), of matching rules. Thus, a scope 410 may be compiled 420 with one or more of the matching rules 430 and/or may be compiled with other matching rules not shown in FIG. 4. For example, it may be that an LDAP scope is compiled with LDAP rules but not with UUID rules. Additionally, in other embodiments, compiled scope information may include compiled scopes all services available within the computing system environment 200 (see FIG. 2).

Referring to FIG. 3, the service consumer computing system 210 generates a query using a scope (act 311). Generating a query using a scope (act 311) may simply involve generating a query that includes the scope, whereupon the query may be transmitted to the service broker computing system(s). Alternatively, the service consumer computing system 210 may perform additional optional steps to generate the query including acts 331 and 332. In FIG. 3, the optional steps are expressed using dotted lines. Depending on which, if any, additional steps the service consumer computing system 210 performs, the service broker computing system may complete the optional steps when evaluating the query and scope (act 321).

In one embodiment, for example, when the service consumer computing system 210 is generating a query using a scope (act 311), the service consumer computing system 210 may optionally perform additional steps in generating a query using a scope. The service consumer computing system 210 may perform either, both or neither of the additional optional steps of generating a compiled scope (act 331) or comparing a scope to compiled scope information (act 332).

For example, the service consumer computing system 210 may generate a query using a scope (act 311) by simply generating a query that includes the scope and transmit the query. Alternatively, the service consumer computing system 210 may instead generate a compiled scope (act 331), and then transmit the query with the compiled scope. Alternatively, the service consumer computing system may perform both the optional steps of generating a compiled scope (act 331) and comparing the scope to compiled scope information (act 332), and then transmitting the query with the result of the comparison from act 332.

Continuing this example with reference to FIG. 3, the service broker computing system 220, in evaluating the query and scope (act 321), may perform any of the following, depending on the information received in the query: 1) if the query included a scope, the service broker computing system 220 may perform the optional steps of generating a compiled scope (act 331) and comparing the scope to compiled scope information (act 332), 2) if the query included a compiled scope, the service broker computing system 220 may skip act 331 (generating a compiled scope) and perform the optional step of comparing the scope to compiled scope information, or 3) if the query included a result of a comparison of a scope to compiled scope information, the service broker computing system 220 may simply evaluate the query and scope (act 321) and perform no additional optional steps 331 or 332.

The act of identifying a service (act 322) may include identifying the service based on the comparison of the scope to the compiled scope information (act 332). The compiled scope information 440 (see FIG. 4) may be the combination of one or more compiled scopes, compiled using one or more matching rules 430. In one embodiment, the compiled scope information 440 may be arranged as one or more text strings. In such an embodiment, the service broker computing system 220 may be able to identify the desired service by simply matching text strings. This may alleviate some potential burden on service broker computing system's processing power 220. Often, service broker computing systems 220 are ill-suited to perform complex processing (e.g. cellular phones, printers, facsimile machines, etc.). Because a text string match requires substantially less processing power than compiling scopes with matching rules, many service broker computing systems 220 would be benefited.

The act of responding to the query (act 323) may include transmitting the location of one or more services and/or service providers 230. After receiving a response to the query (act 312), the service consumer computing system 210 may then access and extract the identification information from the response (act 313). The service consumer computing system 210 may then locate the service using the extracted identification information (act 314). Identification information may include, but is not limited to the following: Internet Protocol address (IP address), Media Access Control address (MAC address), UUID, domain name, telephone number, serial number, scope, compiled scope, or any other means of identifying a service or service provider. If for some reason the service broker computing system 210 was unable to locate the desired service, the response to the query may indicate that the desired service was not found.

Figure 5:
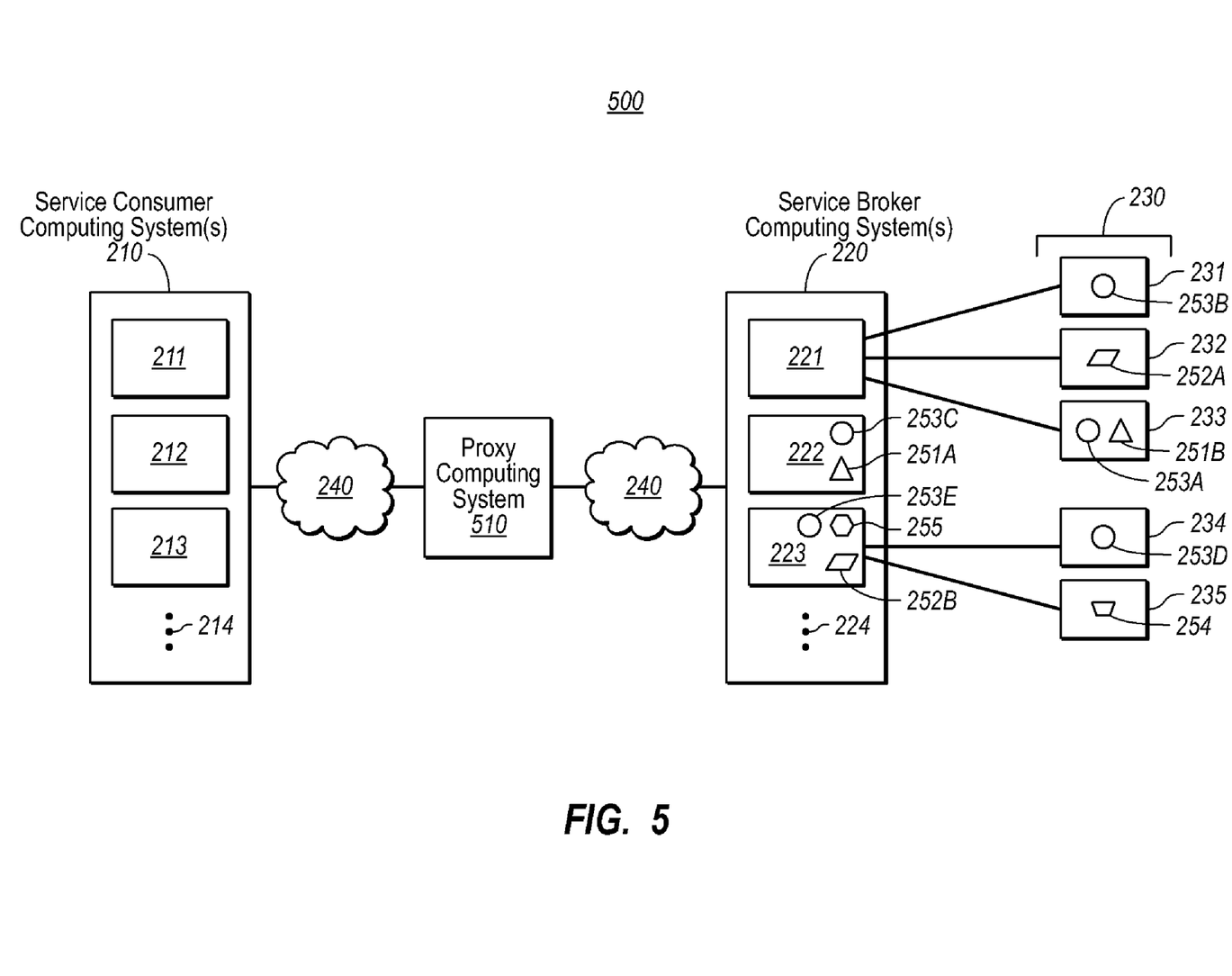
FIG. 5 schematically illustrates an environment in which embodiments of the present invention may operate including a number of service consumer computing systems generating queries used to locate services, a proxy computing system, and a number of service broker computing systems providing responses to queries.

FIG. 5 illustrates an environment 500 in which the principles of the present invention may be employed. The environment 500 includes one or more service consumer computing systems 210, a proxy computing system 510, and one or more service broker computing systems 220 which may link to other service providers 230. As the environment 500 is substantially similar to FIG. 2, the environment 500 of FIG. 5 will now be described with frequent reference to FIG. 2.

In one embodiment, the environment 500 employs a proxy computing system to act as an intermediary between the service consumer computing system 210 and the service broker computing system 220. A proxy computing system 510 is a computing system that is at least configured to receive queries, process information contained in the query and transmit queries. In one embodiment, the service consumer computing system 210 transmits a query to the proxy computing system 510. The proxy computing system 510 processes the query according to the information in the query, and transmits another query to a service broker computing system 220.

Figure 6:
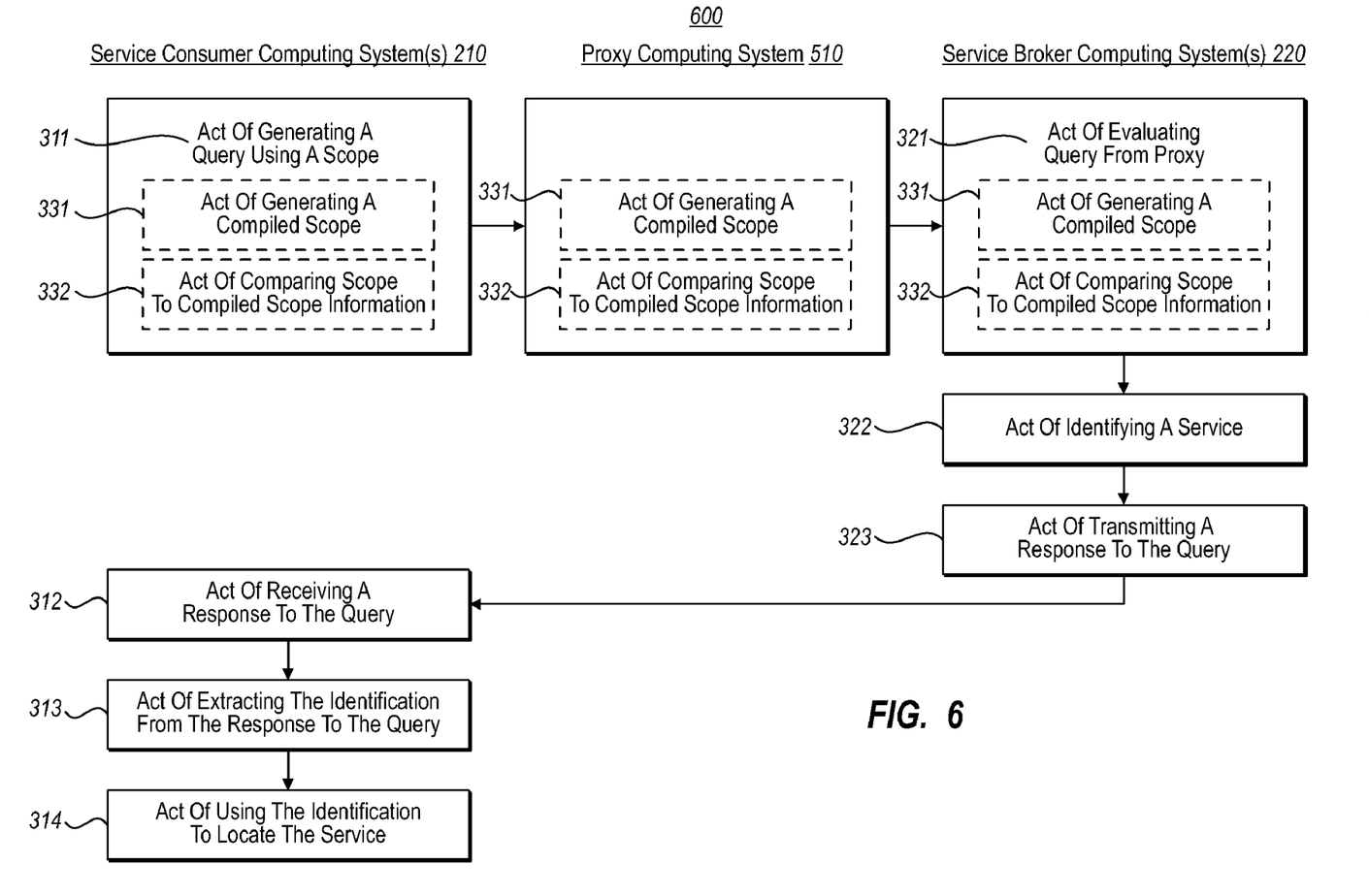
FIG. 6 illustrates a flowchart of a method for locating services in accordance with embodiments of the present invention.

FIG. 6 illustrates a flowchart of a method 600 for a service consumer computing system 210 and a proxy computing system 510 to assist in locating a service offered by one or more service broker computing systems 220 or service providers 230. As the method 600 may be performed in the context of the environment 200 of FIG. 2 and environment 500 of FIG. 5, the method 600 of FIG. 6 will now be described with frequent reference to FIGS. 2 and 5. Acts that are or may be performed by the service consumer computing system are illustrated in the left column of FIG. 6 under the heading "Service Consumer Computing System(s)-210". Acts that are or may be performed by the proxy computing system are illustrated in the middle column of FIG. 6 under the heading "Proxy Computing System-510". Acts that are or may be performed by the service broker computing system are illustrated in the right column of FIG. 6 under the heading "Service Broker Computing System(s)-220".

In one embodiment, method 600 employs a service consumer computing system 210, a proxy computing system 510 and a service broker computing system 220 to locate a desired service. The methods and steps involved are substantially similar to those outlined in method 300 of FIG. 3. As in method 300, optional steps are expressed in dotted lines. Each of the service consumer computing system 210, the proxy computing system 510, and the service broker computing system 220 may perform either, both or neither of the optional steps. Similarly, as in one embodiment of method 300, optional steps (acts 331 and 332) may be skipped if they were performed prior to receiving the query.

For example, if a service consumer computing system 210 generated a query with a scope, before transmitting the query, the service consumer computing system 210 could perform either, both or neither of the additional optional steps (acts 331 and 332). If the service consumer computing system 210 performed act 331, the service consumer computing system 210 could then transmit the query with the compiled scope. Alternatively, if the service consumer computing system 210 performed both of the optional steps, the service consumer computing system 210 could transmit the query with the results of the comparison from act 332. Alternatively, if the service consumer computing system 210 performed neither of the optional steps, the service consumer computing system 210 may simply transmit the query to the proxy computing system 510.

The proxy computing system 510, in turn, could optionally perform both the additional optional steps (acts 331 and 332) and then transmit a query based on the result of the optional steps. Or alternatively, the proxy computing system 510 could perform either or neither of the additional optional steps, depending on what additional steps the query indicated had already been performed. The proxy computing system 510 may then transmit another query to a service broker computing system 220.

The service broker computing system 220 may then evaluate the query from the proxy computing system 510. While evaluating the query from the proxy computing system 510, the service broker computing system 220 may perform either, both or neither of the additional optional steps (acts 331 and 332), depending on what the query from the proxy computing system 510 indicated had already been performed.

As in method 300, the scope could be a pre-compiled scope, where the pre-compiled scope was generated using one or more different matching rules, or alternatively, the scope could be user-inputted search criteria. By transmitting the query to a proxy computing system 510, instead of to all of the service broker computing systems 220, traffic on the network 240 may be significantly reduced.

After evaluating the query from the proxy computing system 510 (act 321) the service broker computing system 220 can identify the location of the service (act 322). The service broker computing system 220 may then transmit a response to the query (act 323) which will be received by the service consumer computing system 210 (act 312), whereupon the service consumer computing system 210 will extract the identification from the response (act 313) and use the identification to locate the service (act 314).

In some embodiments, scope can be compiled into search criteria and included in a query. A service broker computing system 220 can then use the compiled scope and compare it with its compiled scopes to identify potential matches. Unsupported or incompatible compiled scopes can be ignored. Scope information for compiled scopes can be represented in a variety if different ways. In some embodiments, scope information for compiled scopes is represented in XML instructions defined in accordance with an XML schema. The following instructions represent an example XML schema defined data formats used to represent scope information for compiled scopes:

```
<?xml version="1.0" encoding="UTF-8"?>
<xs:schema
  targetNamespace="http://schemas.microsoft.com/ws/2005/04/xdiscovery"
  xmlns="http://schemas.microsoft.com/ws/2005/04/xdiscovery"
  xmlns:xs="http://www.w3.org/2001/XMLSchema"
  elementFormDefault="qualified"
  attributeFormDefault="unqualified">
  <xs:element name="CompiledScopes"
   type="tns:CompiledScopesType"/>
  <xs:complexType name="CompiledScopesType">
    <xs:complexContent>
      <xs:extension base="tns:StringListType">
        <xs:attribute name="StartsWithMatch" type="xs:boolean"
         use="optional" default="false"/>
        <xs:anyAttribute namespace="##other" processContents="lax"/>
      </xs:extension>
    </xs:complexContent>
  </xs:complexType>
  <xs:simpleType name="StringListType">
    <xs:list itemType="xs:string"/>
  </xs:simpleType>
</xs:schema>
```

The next instructions represent a SOAP message including scope information for compiled scopes defined in accordance with the XML schema:

```
<?xml version="1.0" encoding="utf-8"?>
<s:Envelope
  xmlns:a="http://schemas.xmlsoap.org/ws/2004/08/addressing"
  xmlns:d="http://schemas.xmlsoap.org/ws/2005/04/discovery"
  xmlns:i="http://printer.example.org/2003/imaging"
  xmlns:s="http://www.w3.org/2003/05/soap-envelope" >
  <s:Header>
    <a:Action>
      http://schemas.xmlsoap.org/ws/2005/04/discovery/Probe
    </a:Action>
    <a:MessageID>
      uuid:0a6dc791-2be6-4991-9af1-454778a1917a
    </a:MessageID>
    <a:To>urn:schemas-xmlsoap-org:ws:2005:04:discovery</a:To>
  </s:Header>
  <d:Probe>
    <d:Types>i:PrintBasic</d:Types>
    <d:Scopes
     MatchBy="http://schemas.xmlsoap.org/ws/2005/04/discovery/ldap" >
      ldap:///ou=engineering,o=examplecom,c=us
    </d:Scopes>
    <x:CompiledScopes
xmlns:x="http://schemas.microsoft.com/ws/2005/04/xdiscovery"
     StartsWithMatch="true">
       ldapmatch::ldap::389:c=us/o=examplecom/ou=engineering/
    </x:CompiledScopes>
  </d:Probe>
  </s:Body>
</s:Envelope>
```

With these examples:

/s:Envelope/s:Body/d:Probe/x:CompiledScopes is the list of compiled scopes of each of the scopes specified in the request by /s:Envelope/s:Body/d:Probe/d:Scopes for the matching algorithm specified by /s:Envelope/s:Body/d:Probe/d:Scopes/@MatchBy.

The list of compiled scopes is the list of strings that can be matched with the compiled scopes of the service. The service can respond when compiled scopes in the Probe match the compiled scope of the service.

/s:Envelope/s:Body/d:Probe/x:CompiledScopes/@StartsWithMatch indicates how the compiled scopes in the Probe can be matched with the compiled scopes of the service. If false, the compiled scope in the Probe can match with one of the compiled service scopes. If true, the compiled scope in the Probe can match even if the service scope starts with it.

Thus, the embodiments described above illustrate a system and a method for locating services on one or more service broker computing systems using scope information. Using compiled scope information to locate services, the system and method can potentially contribute to a reduced amount of network traffic and a decreased burden on the processing power of service providers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system, the computer system included in a plurality of computer systems connected to a network, the computer system including a processor and system memory, a method for locating a service offered by the one or more of the plurality of computer systems, the method comprising:

an act of receiving a query for locating services, the query including a string that represents a scope for a service to be located, the represented scope providing a contextual identification of the location of the service, the query having been generated from user-input search criteria indicating a desire to locate the service;

an act of comparing the string representing the scope to a plurality of strings representing compiled scopes, each of the plurality of compiled scopes having been previously compiled from scope criteria representing an available service and a set of matching rules into a string, the set of matching rules selected from among a plurality of different sets of matching rules, each of the plurality of different sets of matching rules indicating how to locate services using a specified identification mechanism, from among a plurality of different identification mechanisms shared among the one or more computer systems;

an act of identifying a computer system from among the plurality of computing systems as providing the service to be located based on the comparison of the string representing the scope to the plurality of strings representing the compiled scopes; and an act of providing a response to the query, the response identifying the computer system.

2. The method of claim 1, wherein the service to be located comprises a Web Service.

3. The method of claim 1, wherein the plurality of different identification mechanisms are selected from among the following: Uniform Resource Identifier (URI), Universally Unique Identifier (UUID), Lightweight Directory Access Protocol (LDAP), and String Compare (STRCMP0).

4. The method of claim 1, wherein the plurality of compiled scopes is compiled locally on one or more of the plurality of computing systems.

5. The method of claim 1, wherein the scope represented in the query includes pre-compiled scope information.

6. The method of claim 5, wherein the pre-compiled scope information was compiled using different matching rules.

7. In a computing environment comprising a plurality of computing systems capable of intercommunication, each of the computer systems including a processor and system memory, a method for a proxy to locate a service offered by one or more of the plurality of computing systems, the method comprising:

an act of the proxy receiving a first query for locating services, the first query including a string that represents a user-entered scope for a service to be located, the represented scope providing a contextual identification of the location of the service, the query having been generated from user-input search criteria indicating a desire to locate the service;

an act of the proxy comparing the string representing the user-entered scope to a plurality of strings representing compiled scopes, each of the plurality of compiled scopes having been previously compiled from scope criteria representing an available service and a set of matching rules into a string, the set of matching rules selected from among a plurality of different sets of matching rules, each of the plurality of different sets of matching rules indicating how to locate services using a specified identification mechanism, from among a plurality of different identification mechanisms shared among the one or more computer systems; an act of the proxy identifying a computer system from among the plurality of computer systems as providing the service to be located based on the comparison of the string representing the user-entered scope to the plurality of strings representing the compiled scopes; and an act of the proxy transmitting a second query to the identified computer, wherein the second query includes a string representing a compiled scope that matched the string representing the user-entered scope.

8. The method of claim 7, wherein the proxy receives one or more search criteria and computes the scope based on the search criteria.

9. The method of claim 7, wherein the first query includes pre-compiled scope information.

10. The method of claim 9, wherein the pre-compiled scope information was compiled using different matching rules.

11. The method of claim 7, wherein the second query includes user-inputted search criteria.

12. The method of claim 7, wherein the second query includes pre-compiled scope information.

13. A computer program product for use at a computer system, the computer system included in a plurality of computer systems connected to a network, the computer program product for implementing a method for locating a service offered by the one or more of the plurality of computer systems, the computer system comprising one or more computer storage devices having stored thereon computer-executable instructions that, when executed at a processor, cause the computer system to perform the method, including the following:

receive a query for locating services, the query including a string that represents a scope for a service to be located, the represented scope providing a contextual identification of the location of the service, the query having been generated from user-input search criteria indicating a desire to locate the service;

compare the string representing the scope to a plurality of strings representing compiled scopes, each of the plurality of compiled scopes having been previously compiled from scope criteria representing an available service and a set of matching rules into a string, the set of matching rules selected from among a plurality of different sets of matching rules, each of the plurality of different sets of matching rules indicating how to locate services using a specified identification mechanism, from among a plurality of different identification mechanisms shared among the one or more computer systems;

identify a computer system from among the plurality of computing systems as providing the service to be located based on the comparison of the string representing the scope to the plurality of strings representing the compiled scopes; and provide a response to the query, the response identifying the computer system.

* * * * *